United States Patent
Oota et al.

(10) Patent No.: US 10,571,710 B2
(45) Date of Patent: Feb. 25, 2020

(54) OPTICAL COMPONENT AND IMAGING SYSTEM USING THE SAME

(71) Applicant: Hitachi, Ltd., Chiyoda-ku, Tokyo (JP)

(72) Inventors: Mitsuhiko Oota, Tokyo (JP); Takeshi Shimano, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/847,101

(22) Filed: Dec. 19, 2017

(65) Prior Publication Data

US 2018/0173005 A1 Jun. 21, 2018

(30) Foreign Application Priority Data

Dec. 21, 2016 (JP) .................. 2016-247454

(51) Int. Cl.
*G02B 27/46* (2006.01)
*G02B 27/00* (2006.01)
*H04N 5/357* (2011.01)

(52) U.S. Cl.
CPC ......... *G02B 27/46* (2013.01); *G02B 27/0025* (2013.01); *G02B 27/0087* (2013.01); *H04N 5/3577* (2013.01)

(58) Field of Classification Search
CPC .............. G02B 27/46; G02B 27/0087; G02B 27/0025; G02B 27/0037; G02B 27/0068; G02B 27/0075; G02B 2027/0127; G02B 2027/0138; H04N 5/3577

USPC ............................ 359/619, 621, 626
See application file for complete search history.

(56) References Cited

U.S. PATENT DOCUMENTS

| | | | |
|---|---|---|---|
| 5,151,790 A * | 9/1992 | Takatori .............. | G02B 3/0068 257/E31.128 |
| 5,748,371 A | 5/1998 | Cathey, Jr. et al. | |
| 2009/0323502 A1* | 12/2009 | Murata ............ | B29D 11/00269 369/112.03 |
| 2012/0212965 A1* | 8/2012 | Nakamura ............. | F21V 13/04 362/311.09 |
| 2016/0057337 A1 | 2/2016 | Shimano et al. | |
| 2017/0045653 A1 | 2/2017 | Sakita et al. | |
| 2017/0084046 A1* | 3/2017 | Gill ......................... | G02B 5/18 |
| 2019/0041633 A1* | 2/2019 | Zalevsky ................. | G02C 7/04 |

FOREIGN PATENT DOCUMENTS

| | | |
|---|---|---|
| JP | 2014-197115 A | 10/2014 |
| WO | WO 2015/166539 A1 | 11/2015 |

* cited by examiner

*Primary Examiner* — Jordan M Schwartz
(74) *Attorney, Agent, or Firm* — Crowell & Moring LLP

(57) ABSTRACT

Provided is an optical component including multiple annular zones that each provides a predetermined phase to a light flux passing through an optical system, where for each of the annular zones, the surface closer to the inner circumference of the optical component is substantially equal in area to the surface closer to the outer circumference thereof, and in a cross section in the radial direction of the optical component, the tangent at an outer circumferential end of each annular zone is substantially equal in inclination to the tangent at an inner circumferential end thereof.

6 Claims, 21 Drawing Sheets

Prior Art

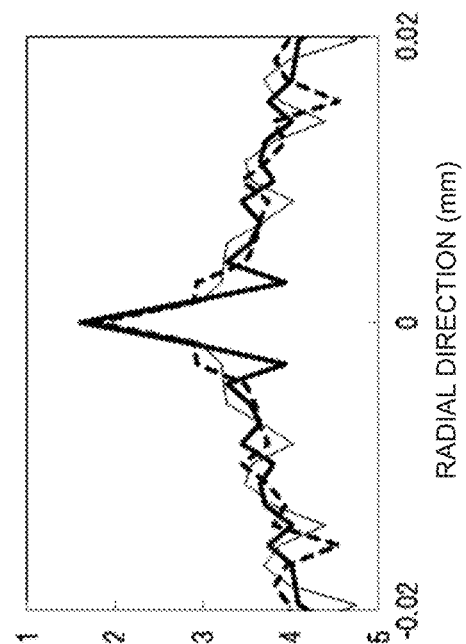
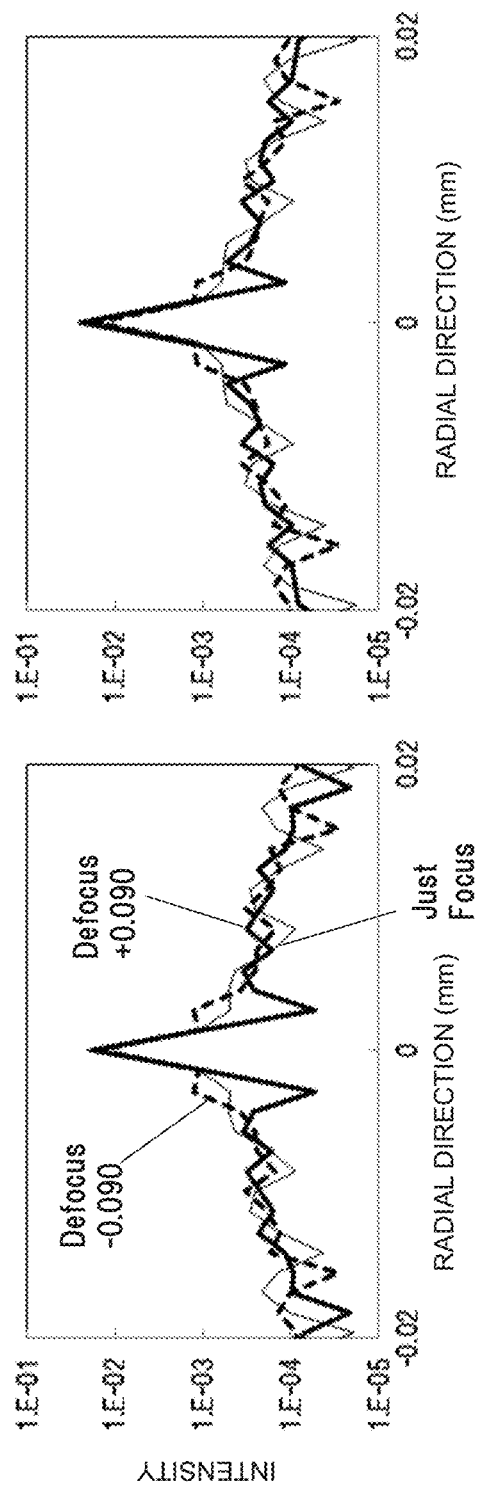

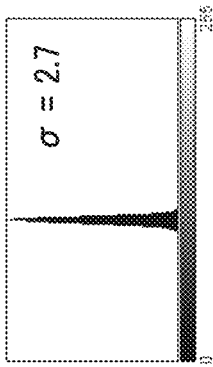
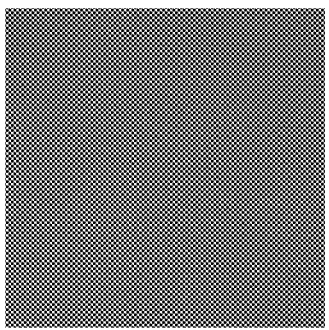
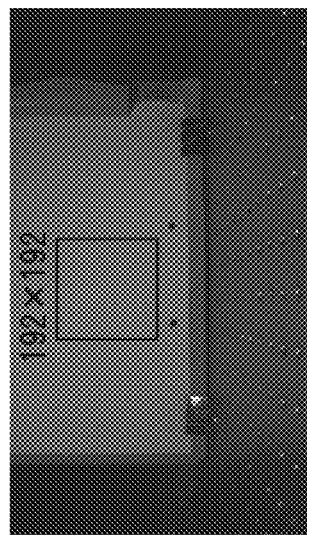
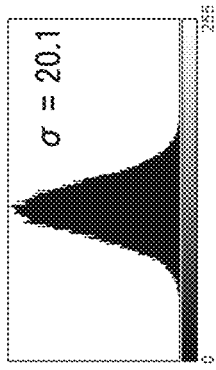
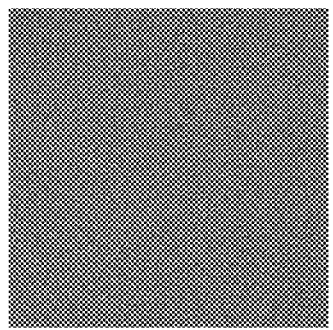
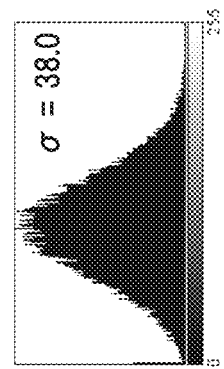
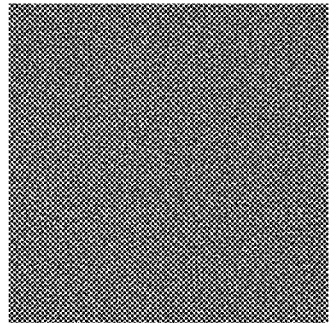

OPTICAL COMPONENT AND IMAGING SYSTEM USING THE SAME

CLAIM OF PRIORITY

This application claims the priority based on the Japanese Patent Application No. 2016-247454 filed on Dec. 21, 2016. The entire contents of which are incorporated herein by reference for all purpose.

BACKGROUND

Technical Field

The present invention relates to an optical component and an imaging system that uses the optical component.

Related Art

The U.S. Pat. No. 5,748,371 discloses a technology of disposing, in an optical system, a phase plate that modulates the phase of light, for obscuring a point spread function (PSF: Point Spread Function), and thus making the shape substantially constant in a range for a certain distance from the in-focus position, and applying signal processing to information of an optical image acquired by an imaging element, for removing the blurring of the PSF, thereby expanding the depth of field or the depth of focus. The technology is referred to as WFC (Wavefront Coding). In addition, JP 2014-197115 A discloses a technique for forming the shape of a phase plate to have an annular zone structure that is rotationally symmetric with respect to the optical axis in WFC. In addition, the PCT International Publication No. 2015/166539 discloses a technology for making the cross-sectional shape of each annular zone asymmetric for a phase plate that has an annular zone structure.

According to the technologies described in the U.S. Pat. No. 5,748,371, JP 2014-197115 A, and the PCT International Publication No. 2015/166539 mentioned above, the signal processing (restoration processing) for removing the blurring of the PSF corresponds to a kind of sharpening processing, and in this sharpening processing, electrical noise of the imaging element will be amplified.

SUMMARY

An object of the present invention is to provide a technology related to an optical component which suppress electrical noise amplification in WFC.

The present application encompasses more than one means for solving at least part of the problem mentioned above, and an example of the means will be given as follows. In order to solve the problem mentioned above, an optical component according to an aspect of the present invention is an optical component including multiple annular zones that each provides a predetermined phase to a light flux passing through an optical system, where for each of the annular zones, the surface closer to the inner circumference of the optical component is substantially equal in area to the surface closer to the outer circumference thereof, and in a cross section in the radial direction of the optical component, the tangent at an outer circumferential end of each annular zone is substantially equal in inclination to the tangent at an inner circumferential end thereof.

According to the present invention, a technology for an optical component can be provided which suppresses electrical noise amplification in WFC and produces clear images with a large depth. Objects, configurations, and advantageous effects other than the foregoing will be evident from the following description of an embodiment.

BRIEF DESCRIPTION OF DRAWINGS

FIGS. 5A and 5B are diagrams showing examples of a PSF that is obtained through the application of the conventional phase plate and a PSF that is obtained through the application of the phase plate according to the first embodiment;

FIGS. 21A through 21G are diagrams showing comparative examples of images of Gb pixels from among pixels for each color of R, Gr, Gb, and B of acquired images.

DETAILED DESCRIPTION

Figure 1:
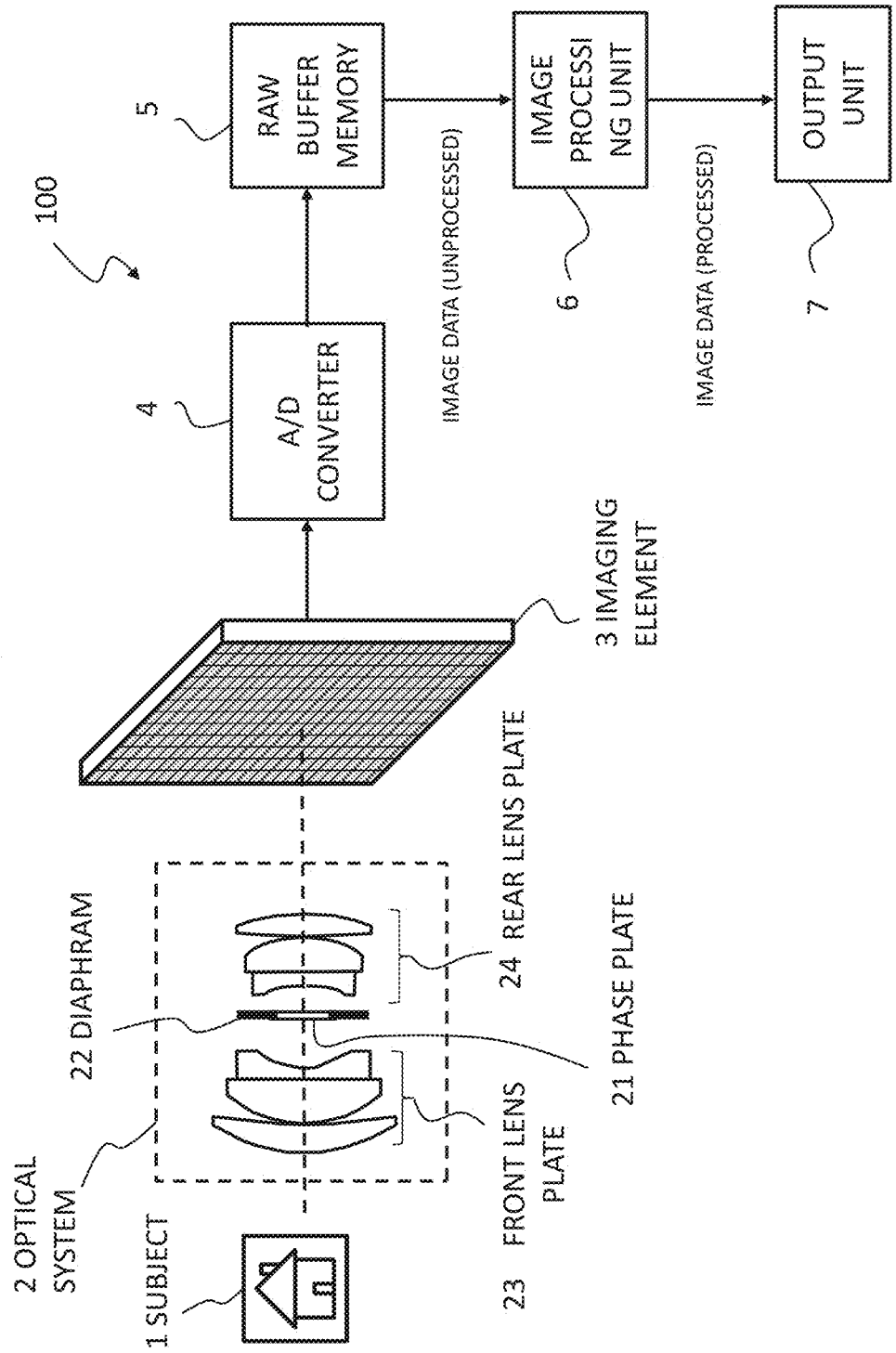
FIG. 1 is a diagram illustrating the configuration of an imaging system according to a first embodiment of the present invention.

In the following embodiments, explanations will be given which are divided into multiple sections or embodiments, if necessary, for the sake of convenience. However, unless expressly stated otherwise, the sections or embodiments are not to be considered independent of one another, but one section or embodiment has a relation partially or entirely with the other, such as modification examples, details, and supplemental explanations.

In addition, in the following embodiments, in the case of referring to the numbers (including numbers, numerical values, amounts, ranges, and the like) of elements, the numbers are not to be considered limited to any specific number, unless expressly stated otherwise, and unless obviously limited to the specific numbers in principle, but may be the specific numbers or more, or less.

Furthermore, in the following embodiments, obviously, the constituent elements (also including elemental steps) are not necessarily to be considered indispensable, unless expressly stated otherwise, and unless considered obviously indispensable in principle.

Likewise, in the following embodiments, in the case of referring to the shapes, positional relationship, and the like of the constituent elements, the shapes and the like are considered including equivalents substantially approximate or similar to the shapes and the like, unless expressly stated otherwise, and unless obviously excluded in principle. The same applies to the numerical values and ranges mentioned above.

In addition, throughout all of the drawings for the explanation of embodiments, the same members are denoted by the same reference numerals in principle, and repeated descriptions thereof will be omitted. Examples of the present invention will be described below with reference to the drawings.

FIG. 1 is a diagram illustrating the configuration of an imaging system according to a first embodiment of the present invention. In the imaging system 100, an imaging device is used which includes an optical system 2, an imaging element 3, an A/D converter 4, a RAW buffer memory 5, an image processing unit 6, and an output unit 7. The optical system 2 includes a front lens group 23, a rear lens group 24, a diaphragm 22, and a phase plate 21.

The diaphragm 22 is located between the front lens group 23 and the rear lens group 24. The diaphragm 22 serves to appropriately condense a light flux emitted from a subject 1 and passed through the optical system 2. The phase plate 21 is provided near the diaphragm 22. The phase plate 21 adds a predetermined phase to the light flux passed through the optical system 2, but may have a site that adds no phase.

The light flux emitted from the subject 1 to enter the optical system 2 forms a subject image on the surface of the imaging element 3 with the assistance of the functions of the front lens group 23 and the rear lens group 24. The phase addition effect of the phase plate 21 makes blurring of the subject image substantially constant in a wide range around the imaging location.

The imaging element 3 has, at the surface thereof, a plurality of pixels. The subject image formed on the surface of the imaging element 3 is converted by the imaging element 3 to analog signals for each pixel, and further converted by the A/D converter 4 to digital signals, thereby generating image data corresponding to the subject image.

The RAW buffer memory 5 stores image data obtained from the A/D converter 4. The image processing unit 6 receives the image data from the RAW buffer memory 5, and applies signal processing for removing the subject image blurred due to the phase modulation of the phase plate 21. Methods for the signal processing include various types of known processing. For example, a method of using a spatial filter may be adopted. The modified image is supplied to the output unit 7. The output unit 7 may be, for example, a unit capable of outputting with the use of various types of digital data, such as a display, a storage device, a communication device, and a printer.

Figure 2:
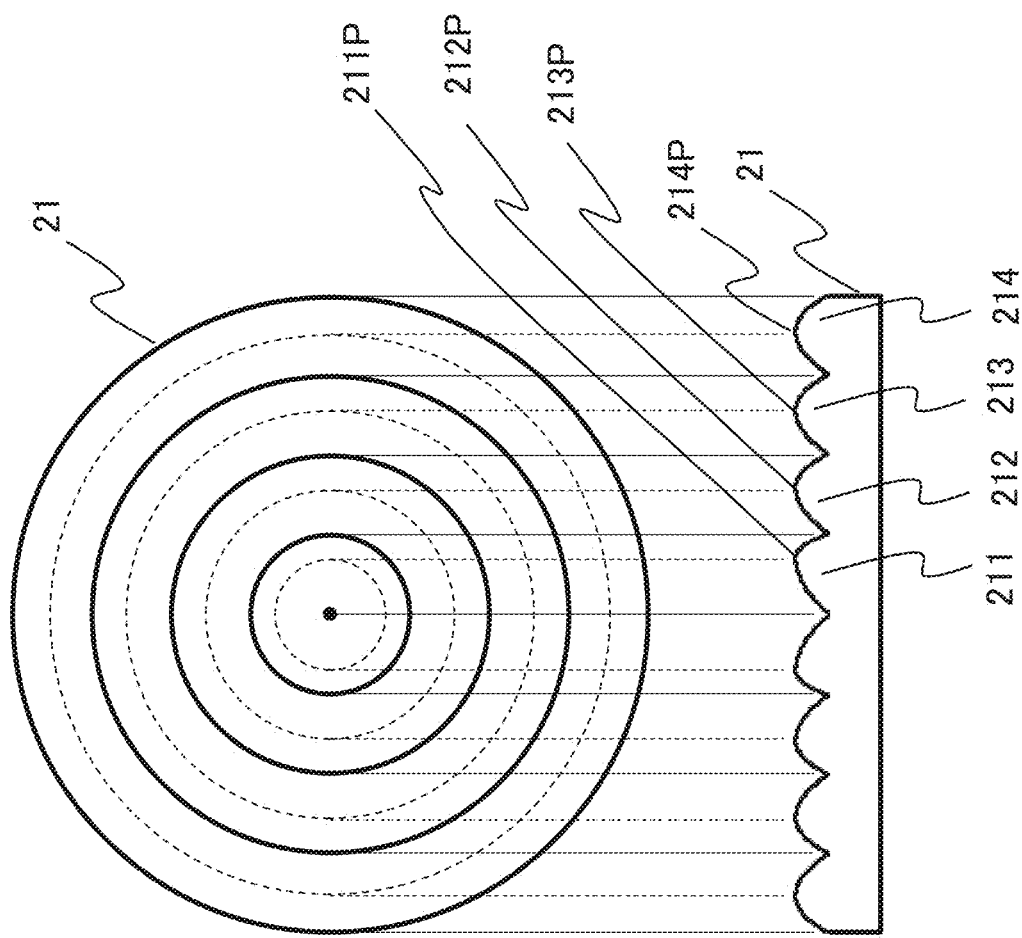
FIGS. 2A and 2B are diagrams illustrating the configuration of a conventional phase plate.

FIGS. 2A and 2B are diagrams illustrating the configuration of a conventional phase plate. FIG. 2A shows a front view of the phase plate 21, whereas FIG. 2B shows a cross-sectional view along the radius and diameter of the phase plate 21. The optical axis is adapted in a direction perpendicular to the plane of paper in FIG. 2A, and vertically in FIG. 2B. Light beams from the subject 1 are adapted to travel upward from the bottom in FIG. 2B.

In addition, the phase plate 21 is composed of, for example, four annular zones that are equal in width. The annular zones include, from the inner side of the phase plate 21, a first annular zone 211, a second annular zone 212, a third annular zone 213, and a fourth annular zone 214. The respective annular zones have protruded shapes with maximum values 211P, 212P, 213P, 214P between inner circumferential ends and outer circumferential ends in the cross-sectional view. The radius coordinates for the maximum values are expressed by dashed lines in FIG. 2A.

Figure 3:
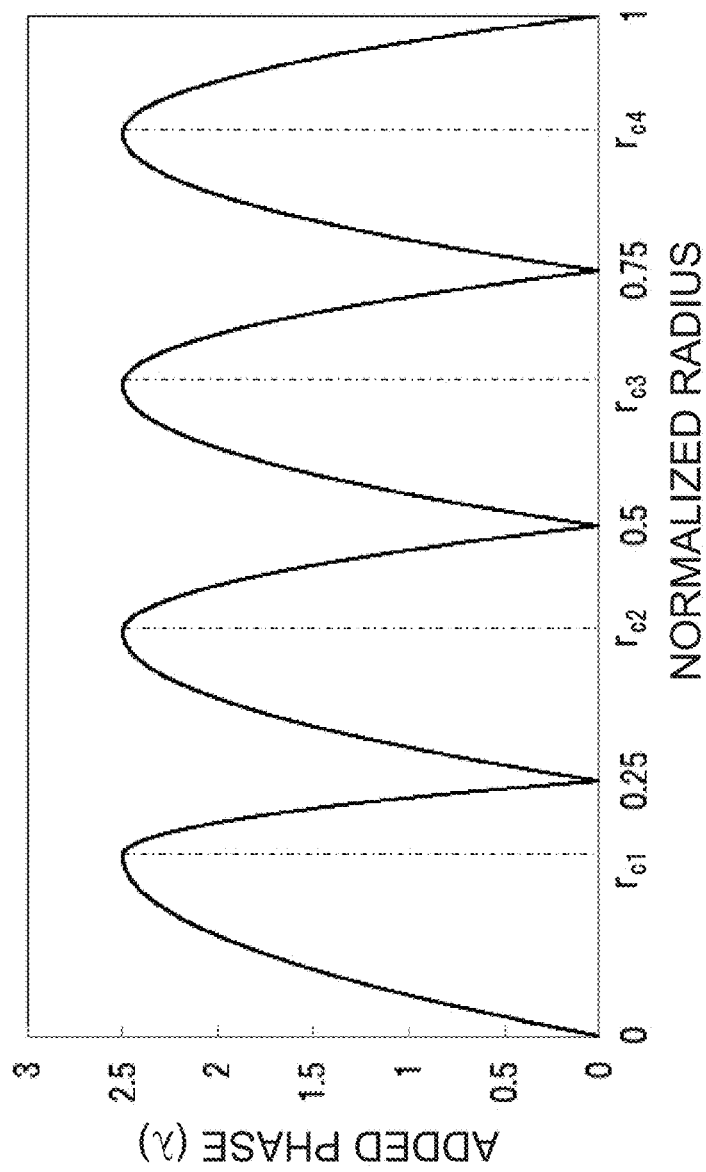
FIG. 3 is a diagram showing phases added by the conventional phase plate.

FIG. 3 is a diagram showing phases added by the conventional phase plate. In FIG. 3, the horizontal axis indicates a normalized radius, whereas the vertical axis indicates a phase added by the phase plate 21 to a specific wavelength. The magnitude of the phase added is proportional to the height in the cross section of the phase plate 21, and thus becomes easy to understand when the vertical axis is considered as the height of the phase plate 21. In the figure, $r_{c1}$, $r_{c2}$, $r_{c3}$, and $r_{c4}$ represent normalized radius coordinates at which the respective annular zone heights of the phase plate 21 have maximum values.

When the phase plate 21 is disposed in the optical system, the region closer to the inner circumference than $r_{ci}$ at the i-th annular zone from the inner circumference side serves to diffuse incident light to the near side from the original focus position (in-focus side), whereas the region closer to the outer circumference than $r_{ci}$ diffuses the incident light to the far side from the original focus position (out-of-focus side). In this regard, the $r_{ci}$ at each annular zone is adapted such that the region closer to the inner circumference than $r_{ci}$ is substantially equal to the region closer to the outer circumference than $r_{ci}$ in area, that is, in the area to be subjected to phase addition. For this reason, the amount of light that makes a contribution to a PSF can be equalized around the focus position.

It is to be noted that as for the area to be subjected to phase addition, the region closer to the inner circumference than $r_{ci}$ is desirably equal in area to the region closer to the outer circumference than $r_{ci}$, but there may be a slight difference therebetween. For example, the area ratio of the region closer to the inner circumference may be 0.9 to 1.1 or the like with respect to the region closer to the outer circumference.

Figure 4:
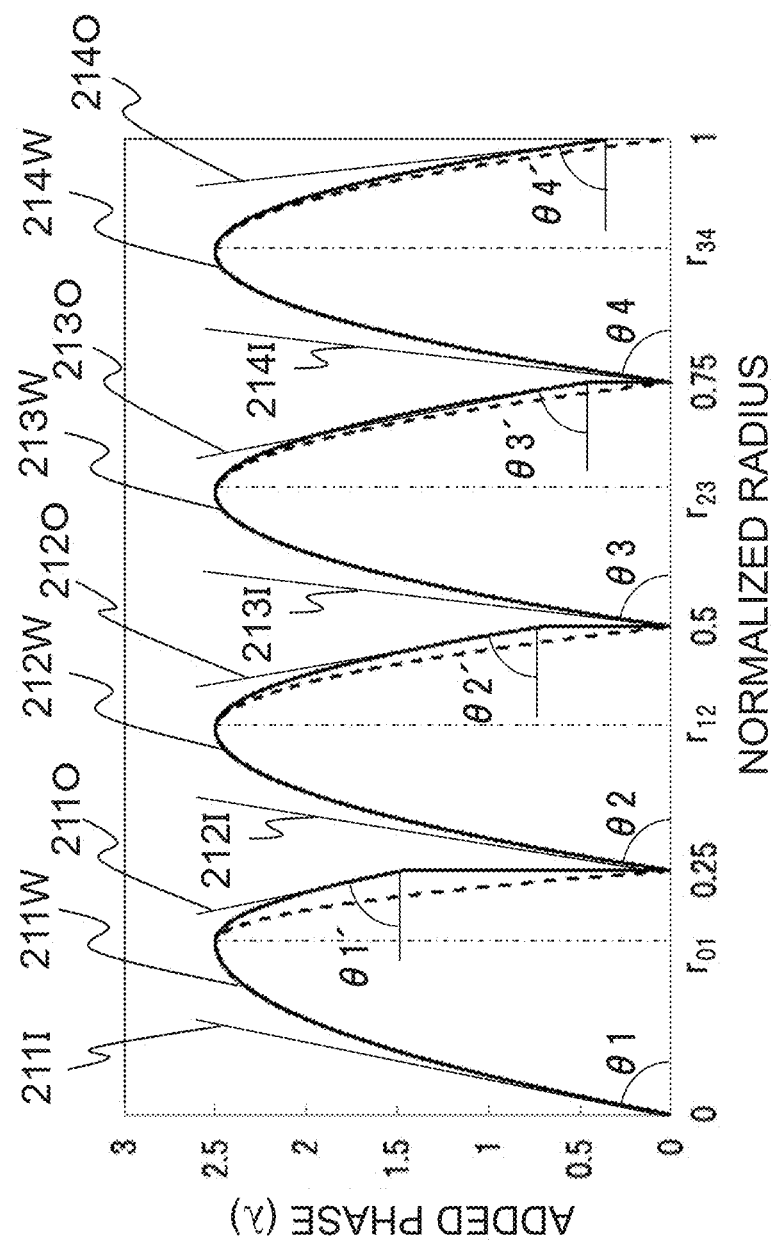
FIG. 4 is a diagram showing an example of phases added by a phase plate according to the first embodiment.
Figure 9:
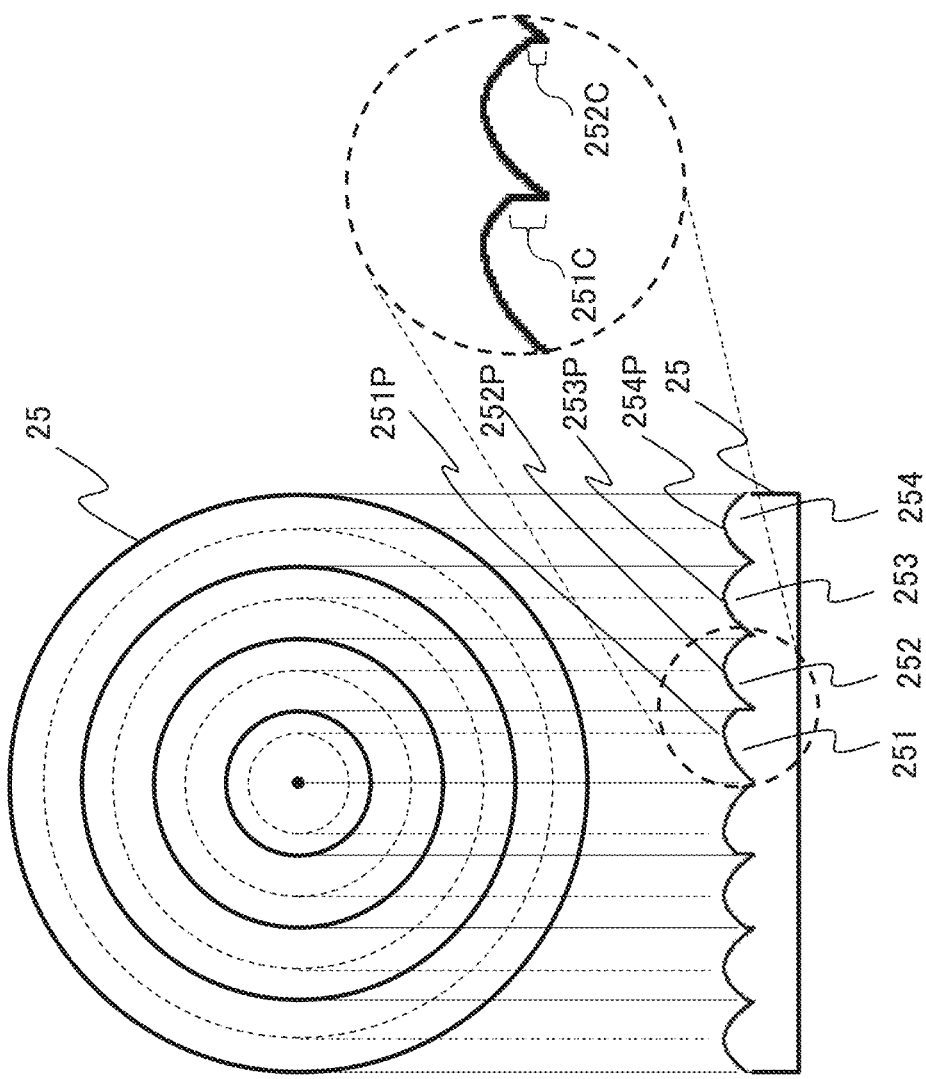
FIGS. 9A and 9B are diagrams illustrating the configuration of a phase plate according to the first embodiment.

FIG. 4 is a diagram showing an example of phases added by a phase plate according to the first embodiment. FIG. 4 have the same vertical axis and horizontal axis as those in FIG. 3. In addition, the solid line in the graph indicates phases added according to the first embodiment, and the dashed line therein indicates phases added by the conventional phase plate 21. While the shape of the phase plate 25 according to the first embodiment will be described later in the description of FIG. 9, the number of annular zones, the maximum height values of the added phases in the respective annular zones, and the normalized radius coordinates for the maximum values are adapted in the same manner as those of the conventional phase plate 21.

The phase plate 25 according to the first embodiment differs from the conventional phase plate 21 in that the inclinations θi of tangents 211I, 212I, 213I, 214I at the inner circumferential ends of the respective annular zones are adapted to be substantially equal to the inclinations θi' of tangents 211O, 212O, 213O, 214O at the outer circumferential ends thereof in a cross section in the radial direction of the phase plate. More specifically, as compared with the conventional phase plate 21, the difference can be said to be that the slope of the added phase is gentle in the outer region from the normalized radius coordinate for the maximum value of the added phase in each annular zone. In addition, the inclination θi at the inner circumferential end of any annular zone is larger than the inclination θi at the inner circumferential end of another annular zone located closer to the inner circumference than the foregoing annular zone. It is to be noted that the inclination θi is desirably equal to the inclination θi', but there may be a slight difference therebetween. For example, the ratio of the inclination θi' to the inclination θi may be 0.9 to 1.1 or the like.

There is a proportional relationship between the magnitude of the slope of the added phase and the light diffusion effect, and thus, the phase plate 25 according to the first embodiment can equalize not only the amount of light that makes a contribution to the PSF around the focus position, but also the light diffusion effect, that is, the blurring degree of the PSF around the focus position.

FIGS. 5A and 5B are diagrams showing examples of a PSF that is obtained through the application of the conventional phase plate and a PSF that is obtained through the application of the phase plate according to the first embodiment. More specifically, FIGS. 5A and 5B are diagrams for explaining the blurring degree of the PSF around the focus position, in comparison with the conventional example. FIG. 5A shows an example of a PSF that is obtained with the conventional phase plate 21, whereas FIG. 5B shows an example of a PSF in the case of using the phase plate 25 according to the first embodiment. In each figure, the horizontal axis indicates the radius coordinate of a light-receiving surface, whereas the vertical axis indicates the intensity of the PSF. In each case, the F value of the optical value is set to be F#1.27.

In FIGS. 5A and 5B, the thin line, the thick solid line, and the thick dashed line respectively indicate a PSF at the focus position, a PSF at a +0.09 mm (millimeters) position from the focus position, and a PSF at a −0.09 mm position from the focus position. In FIGS. 5A and 5B, the phase plate 25 according to the first embodiment and the conventional phase plate 21 are almost equal in the shape of the PSF at the focus position and the −0.09 mm position, but with respect to the PSF at the +0.09 mm position, the phase plate 25 according to the first embodiment has a larger value than the conventional phase plate 21, which namely indicates a lower degree of blurring degree. Furthermore, as a result of reducing the blurring degree of the PSF at the +0.09 mm position, the PSF at the −0.09 mm position and the PSF at the +0.09 mm position are similar in shape.

Figure 6:
FIG. 6 is a diagram showing a test chart.

FIG. 6 is a diagram showing a test chart. The test chart is intended to be used in a unified way for evaluating the quality of the imaging system, and the test chart itself may be another chart or the common subject 1.

Figure 7:
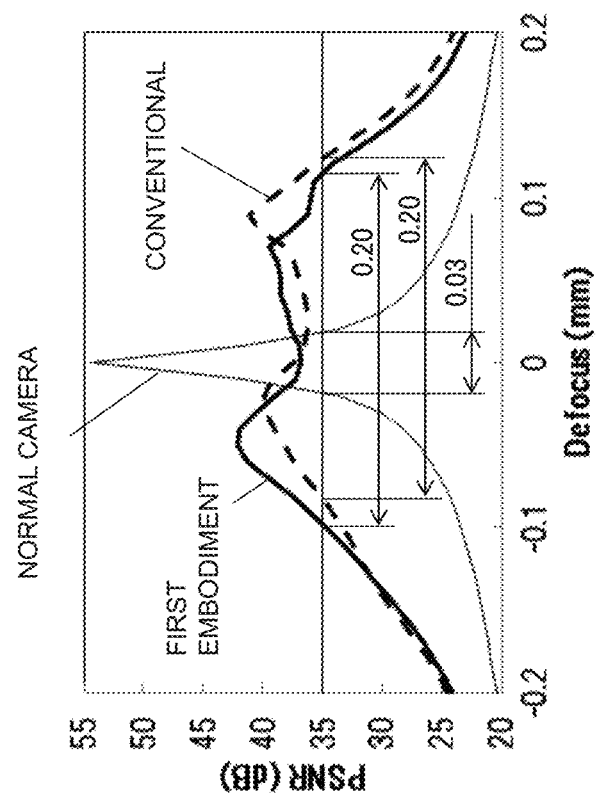
FIG. 7 is a diagram showing a graph for comparing the quality of output images from separate imaging systems.

FIG. 7 is a diagram showing a graph for comparing the quality of output images from separate imaging systems. The horizontal axis indicates defocus, whereas the vertical axis indicates an index of the quality of an image, PSNR (Peak Signal to Notice). The graph shows the results of calculating the quality of an output image for each of: an imaging system that uses the conventional phase plate 21; and an imaging system that uses the phase plate 25 according to the first embodiment, with the test chart shown in FIG. 6 as an input image. It is to be noted that the PSNR is defined by the following formula.

<Mathematical Formula 1>

$$PSNR = 10 \log_{10} \frac{mn \cdot \text{Max}^2}{\sum_{i=1}^{m} \sum_{j=1}^{n} \{A'(i,j) - A(i,j)\}^2}$$ Mathematical Formula 1

Where Max represents the maximum luminance of an image, m and n respectively represent the numbers of horizontal and vertical pixels, A'(i, j) represents an output image, A(i, j) represents an original image. In FIG. 7, the thin line, the thick solid line, and the thick dashed line respectively indicate the quality of an output image from a normal camera, the quality of an output image from a WFC applied camera that uses the phase plate 25 according to the first embodiment, and the quality of an output image from a WFC applied camera that uses the conventional phase plate 21. In any of the systems, the F value of the optical system and the pixel pitch of the sensor are respectively adapted to be F#1.27 and 5.5 μm (micrometers), and the PSNR is calculated assuming that no electrical noise is included.

When PSNR of 35 dB or more is regarded as a focal range, the normal camera is about 0.03 mm in depth of focus, and the camera using the phase plate 25 according to the first embodiment and the camera using the conventional phase plate 21 are each about 0.20 mm in depth of focus. More specifically, the phase plate 25 according to the first embodiment can be considered to have a comparable focal depth expansion effect to that of the conventional phase plate 21.

Figure 8:
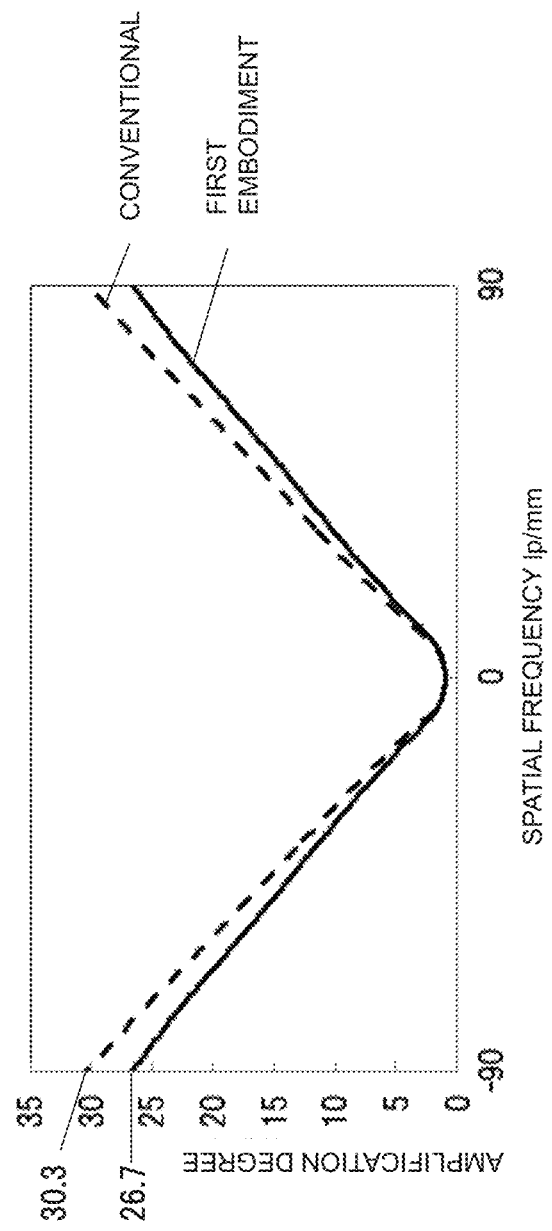
FIG. 8 is a diagram showing a graph for comparing signal amplification degrees in restoration processing for each imaging system.

FIG. 8 is a diagram showing a graph for comparing signal amplification degrees in restoration processing for each imaging system. In FIG. 8, the horizontal axis indicates a spatial frequency, whereas the vertical axis indicates a signal amplification degree. In each imaging system, the signal amplification degree with respect to each spatial frequency is adapted such that appropriate deblurring is achieved with respect to the PSF averaged for defocus±(plus and minus) 0.1 mm. The solid line indicates a case of using the phase plate 25 according to the first embodiment, and the dashed line indicates a case of using the conventional phase plate 21. In general, in WFC, the action of amplifying electrical noises of the imaging element is generated in restoration processing, thereby leading to image degradation, and the signal amplification degree is thus desirably low.

As shown in FIG. 8, at the maximum spatial frequency of 90 lp/mm (line pairs/mm), the signal amplification degree is 30.3 in the case of using the conventional phase plate 21, whereas the signal amplification degree is 26.7 in the case of using the phase plate 25 according to the first embodiment, and the signal amplification degree in the case of using the phase plate 25 according to the first embodiment can be considered decreased as compared with that in the case of using the conventional phase plate 21.

As described above, the phase plate 25 according to the first embodiment in accordance with the present invention reduces blurring of the PSF on the out-of-focus side as compared with the conventional example, thereby making it possible to decrease the signal amplification degree of WFC while maintaining a comparable focal depth expansion effect.

FIGS. 9A and 9B are diagrams illustrating the configuration of the phase plate according to the first embodiment. For the phase plate 25 according to the first embodiment, as compared with the conventional phase plate 21, a first annular zone 251, a second annular zone 252, a third annular zone 253, and a fourth annular zone 254 are respectively provided with, on the outer circumference side, surfaces substantially parallel to the optical axis (hereinafter, referred to as "standing walls") as standing walls 251C to 254C. It is to be noted that when there is a standing wall, the upper end of the standing wall is referred to as an outer circumferential end, and the lower end of the standing wall is referred to as an inner circumferential end of the annular zone on the outer circumference side. In addition, light passing through the phase plate 25 undergoes no change in phase due to the standing walls.

Figure 10:
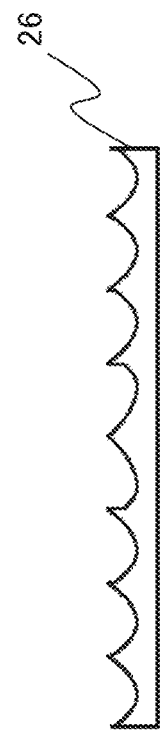
FIG. 10 is a diagram illustrating the configuration of a phase plate according to a second embodiment.

FIG. 10 is a diagram illustrating the configuration of a phase plate according to a second embodiment. The phase plate 26 according to the second embodiment differs in that each annular zone according to the second embodiment has a depressed shape, whereas each annular zone according to the first embodiment has a protruded shape. Even with this phase plate 26 according to the second embodiment, an effect similar to that of the phase plate according to the first embodiment is achieved by matching the slope of a tangent at an outer circumferential end with the slope of a tangent at an inner circumferential end for each annular zone in the same way as in the first embodiment.

Figure 11:
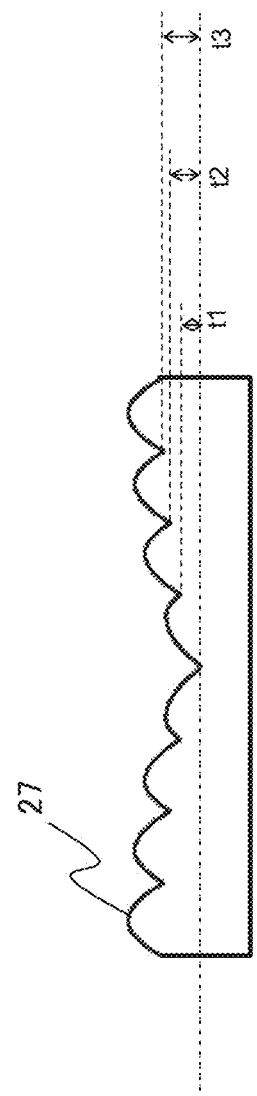
FIG. 11 is a diagram illustrating the configuration of a phase plate according to a third embodiment.

FIG. 11 is a diagram illustrating the configuration of a phase plate according to a third embodiment. As for the phase plate 27 according to the third embodiment, while the phase plate 25 according to the first embodiment has standing walls provided between the respective annular zones, the shape of the phase plate 27 according to the third embodiment is configured such that an annular zone on the outer circumference side is shifted in the optical axis direction so as to fill the drop of the standing wall. More specifically, as for radius coordinates as a boundary between a first annular zone and a second annular zone, the coordinate of an endpoint of the first annular zone in the optical axis direction is coincident with the coordinate of an end point of the second annular zone in the optical axis direction, and as for radius coordinates as a boundary between the second annular zone and a third annular zone, the coordinate of an end point of the second annular zone in the optical axis direction is coincident with the coordinate of an endpoint of the third annular zone in the optical axis direction. Furthermore, as for radius coordinates as a boundary between the third annular zone and a fourth annular zone, the coordinate of an end point of the third annular zone in the optical axis direction is coincident with the coordinate of an end point of the fourth annular zone in the optical axis direction. In other words, the outer circumferential end of the annular zone can be considered connected to the inner circumferential end of the annular zone located on the outer circumference side of the outer circumferential end. In addition, the outer circumferential end for each annular zone is located at a higher level than the inner circumferential end of the annular zone.

In addition, there is a difference of t1 between the minimum value on the inner circumference side of the first annular zone and the minimum value on the inner circumference side of the second annular zone, there is a difference of t2 equal to or larger than t1 between the minimum value on the inner circumference side of the first annular zone and the minimum value on the inner circumference side of the third annular zone, and there is a difference of t3 equal to or larger than t2 between the minimum value on the inner circumference side of the first annular zone and the minimum value on the inner circumference side of the fourth annular zone. Even in this shape, substantially the same effect is achieved as in the first embodiment. The phase plate 27 according to the third embodiment is manufactured more easily than the phase plate 25 according to the first embodiment because the phase plate 27 has no standing wall as a step, and can be considered more versatile in that stray light can be avoided even when light enters a wall perpendicular to the optical axis of the step part.

Figure 12:
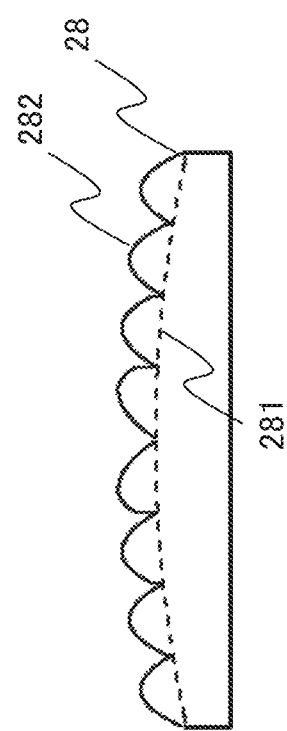
FIG. 12 is a diagram illustrating the configuration of a phase plate according to a fourth embodiment.

FIG. 12 is a diagram illustrating the configuration of a phase plate according to a fourth embodiment. The phase plate 28 according to the fourth embodiment is obtained by adding a lens function to the phase plate 21 according to the first embodiment. The dashed line in the figure indicates a curved surface 281 that provides a lens function. A phase addition part 282 for obscuring the PSF is adapted to be added on the curved surface 281. More specifically, according to the present embodiment, the slope of a tangent at the outer circumferential end of each annular zone and the slope of a tangent at the inner circumferential end thereof are adapted to be equal to each other in the planar shape obtained by removing, from the actual planar shape, the planar shape of the curved surface 281 for providing a lens function.

In other words, when the shape of the upper surface of the phase plate 21 according to the first embodiment is expressed by a predetermined function f(r), whereas the shape of the curved surface 281 is expressed by a predetermined function g(r), the shape of the upper surface of the phase addition part 282 of the phase plate 28 according to the fourth embodiment has an established relationship expressed by g(r)+f(r). The optical component with the lens and the phase plate integrated in accordance with the configuration of the planar shape, which allows for lower prices and space saving, achieves an effect similar to that of the optical system according to the first embodiment.

Figure 13:
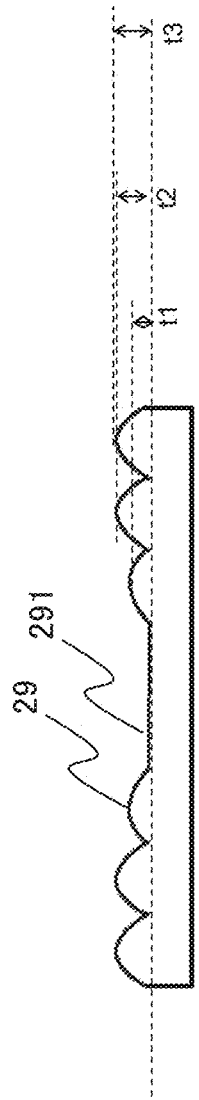
FIG. 13 is a diagram illustrating the configuration of a phase plate according to a fifth embodiment.

FIG. 13 is a diagram illustrating the configuration of a phase plate according to a fifth embodiment. The phase plate 29 according to the fifth embodiment has annular zones increased in height toward the outer circumference side. More specifically, the maximum value of each annular zone is increased toward the annular zone on the outer circumference side. In addition, the maximum value of a first annular zone 291 may be equal to the minimum value of the first annular zone 291, that is, the first annular zone 291 may be flat. Specifically, the difference t1 between the maximum value of the first annular zone 291 and the maximum value of a second annular zone may be equal to or smaller than the difference t2 between the maximum value of the first annular zone 291 and the maximum value of a third annular zone, and the difference t2 between the maximum value of the first annular zone 291 and the maximum value of the third annular zone may be equal to or smaller than the difference t3 between the maximum value of the first annular zone 291 and the maximum value of a fourth annular zone.

Figure 14:
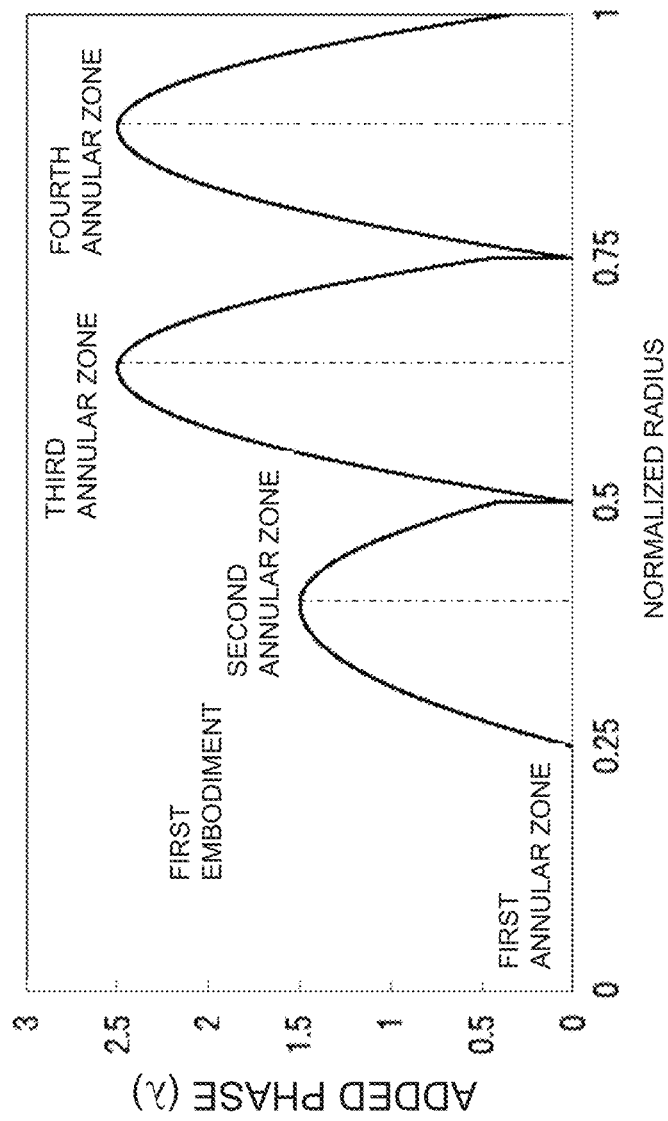
FIG. 14 is a diagram showing an example of phases added by the phase plate according to the fifth embodiment.

FIG. 14 is a diagram showing an example of phases added by the phase plate according to the fifth embodiment. The vertical axis and horizontal axis of the graph respectively indicate a normalized radius and an added phase, as with the graph in FIG. 3. The phase plate 29 according to the fifth embodiment is adapted to have annular zones increased in height toward the outer circumference side, and the slope of a tangent at an inner circumferential end of each annular zone and the slope of a tangent at an outer circumferential end thereof are adapted to be equal to each other. However, the innermost annular zone (first annular zone 291) is not provided with any phase addition part. More specifically, the phase addition part of the first annular zone 291 is 0 mm in height, and the added phase is OX. The first annular zone 291 is, however, not limited thereto, but may be adapted to add a slight phase or a lower phase than that of the second annular zone. It is to be noted that any standing wall may be present or absent.

Figure 15:
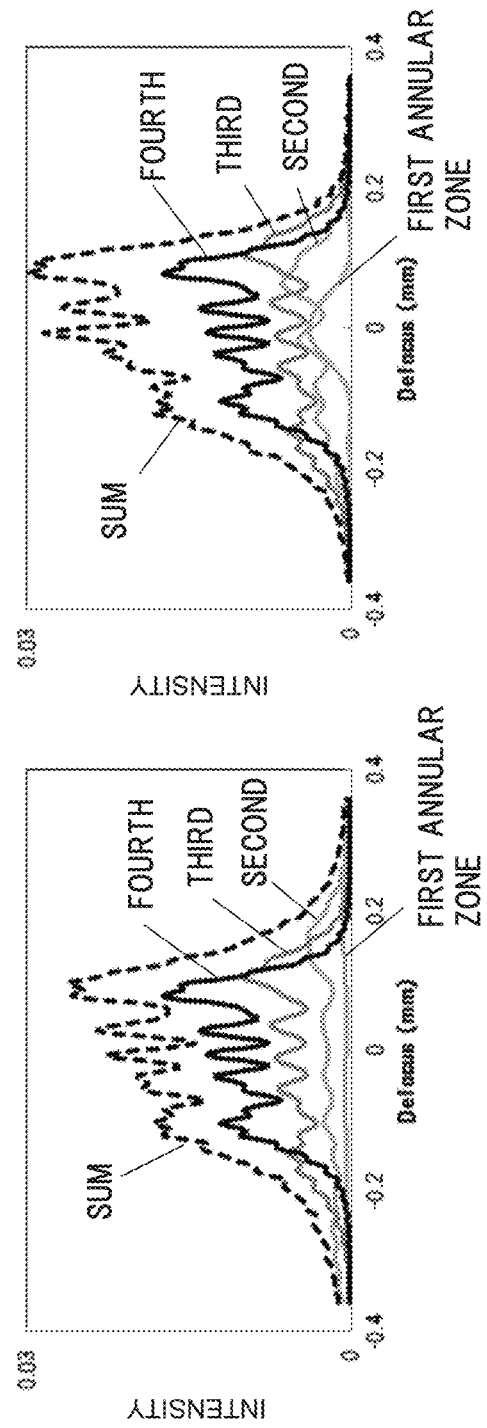
FIGS. 15A and 15B are diagrams showing examples of PSFs obtained with the phase plate according to the first embodiment and the phase plate according to the fifth embodiment.

FIGS. 15A and 15B are diagrams showing examples of PSFs obtained with the phase plate according to the first embodiment and the phase plate according to the fifth embodiment. With reference to FIGS. 15A and 15B, the ability to reduce blurring of the PSF with a focal depth expansion effect maintained in a manner that increases the heights of the annular zones toward the outer circumference side will be described with the use of PSFs. The horizontal axes of the graphs in FIGS. 15A and 15B each indicate defocus, whereas the vertical axes thereof each indicate intensity at the center of the PSF. The graph in accordance with FIG. 15A refers to a graph that shows the central intensity of the PSF formed by the phase plate 25 according to the first embodiment, whereas the graph in accordance with FIG. 15B refers to a graph that shows the central intensity of the PSF formed by the phase plate 29 according to the fifth embodiment.

Lines corresponding to the PSFs formed by the respective annular zones and the PSF formed by the whole phase plate as the sum of the respective PSFs are shown in each graph of FIGS. 15A and 15B. As shown in FIG. 15A, the PSF for each annular zone has, around the focus position, a range in which the central intensity is substantially constant. As a result, the central intensity of the PSF as the sum is substantially constant, and this range corresponds to a depth of focus obtained by WFC. The PSF as the sum means that blurring is increased as the value of the central intensity is decreased. It is to be noted that this range in which the central intensity is substantially constant can be defined as a range from a position at which the central intensity of the PSF as the sum starts to decrease monotonically in the minus direction of defocus to a position at which the central intensity of the PSF as the sum starts to decrease monotonically in the plus direction of defocus.

When attention is paid to the range in which the central intensity of each PSF is substantially constant in FIG. 15A, the range is wider toward the annular zone on the inner circumference side. In addition, the central intensity of the PSF as the sum is less affected toward the annular zone on the inner circumference side. For this reason, as long as the outermost annular zone is constant in height, the focal depth expansion effect can be maintained, even when the annular zones are adapted to increase in height toward the outer circumference side (to decrease in height toward the inner circumference side).

In FIG. 15B, the central intensity of the PSF for each of the first annular zone and the second annular zone has a slightly narrower range in which the central intensity is substantially constant as compared with the first embodiment, while the average for the intensity in the range is increased. As a result, while the range in which the central intensity of the PSF as the sum is substantially constant remains rarely different from that in the case of using the phase plate 25 according to the first embodiment, the intensity is increased. This means that blurring of the PSF is reduced with a focal depth expansion effect maintained.

Figure 16:
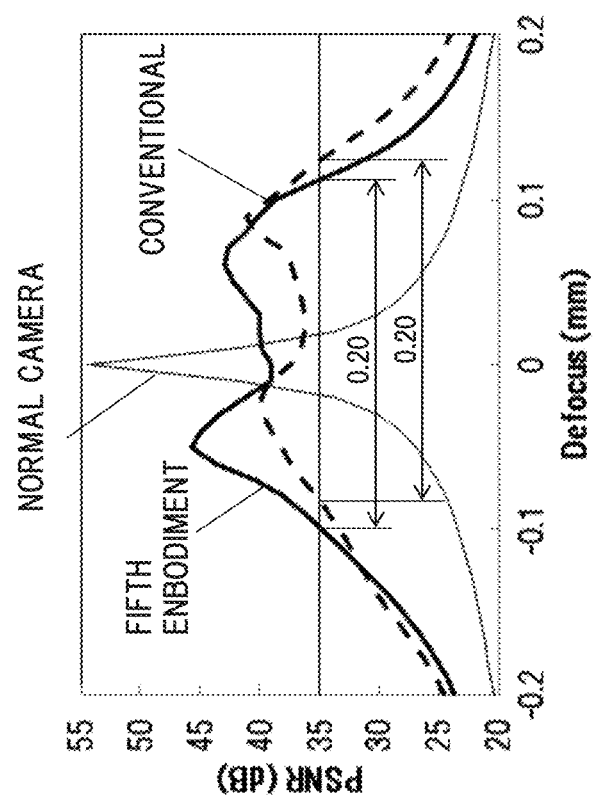
FIG. 16 is a diagram showing a graph for comparing the quality of output images from separate imaging systems.

FIG. 16 is a diagram showing a graph for comparing the quality of output images from separate imaging systems. The quality of an output image obtained by WFC in the case of using the phase plate 29 according to the fifth embodiment is indicated by a thick solid line. The conditions set are the same as the conditions shown in FIG. 7, and the test chart shown in FIG. 6 is adopted as an input image. The normal camera and the conventional phase plate 21 have the same values as in FIG. 7. The depth of focus according to the fifth embodiment is about 0.20 mm, and the case of using the phase plate 29 according to the fifth embodiment can be also considered to have a focal depth expansion effect comparable to that in the case of using the conventional phase plate 21.

Figure 17:
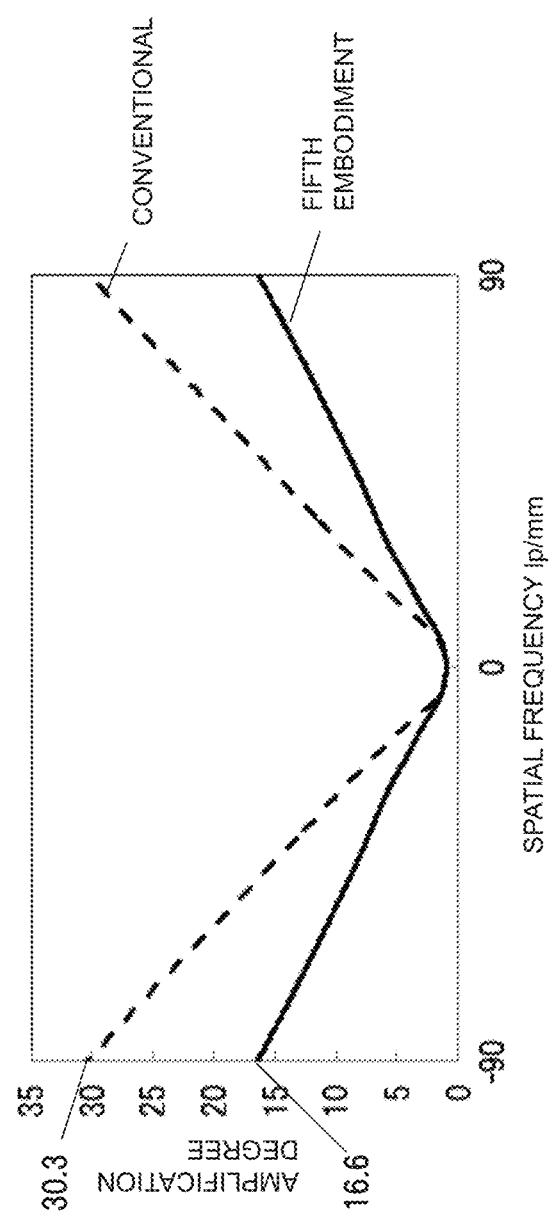
FIG. 17 is a diagram showing a graph for comparing signal amplification degrees in restoration processing for each imaging system.

FIG. 17 is a diagram showing a graph for comparing signal amplification degrees in restoration processing for each imaging system. The graph in FIG. 17 is a graph that shows signal amplification degrees in restoration processing, as with FIG. 8. The values in the case of using the phase plate 29 according to the fifth embodiment are indicated by a solid line, whereas the values in the case of using the conventional phase plate 21 are indicated by a dashed line. The values in the case of using the conventional phase plate 21 are the same values as in FIG. 8. The signal amplification degree according to the fifth embodiment at the maximum spatial frequency is 16.6 in FIG. 17, which is decreased from the signal amplification degree of 30.0 in the case of using the conventional phase plate 21, and moreover decreased from the signal amplification degree 26.7 in the case of using the phase plate 25 according to the first embodiment.

As described above, according to the fifth embodiment, the signal amplification degree can be further decreased as compared with the first embodiment while maintaining a focal depth expansion effect comparable to the conventional phase plate 21. More specifically, electrical noise amplification can be further suppressed.

FIGS. 18 through 21G show experimental results for the verification of the electrical noise suppression effect according to the present invention. The cameras used for the experiments each use a lens with an F value of F#1.27, and an imaging element with the number of pixels: 1920 horizontal×1080 vertical, and a pixel pitch of 2.75 μm, and with a Bayer filter provided.

Figure 18:
FIG. 18 is a diagram showing an example of an image acquired by a normal camera with natural objects as a subject.

FIG. 18 is a diagram showing an example of an image acquired by a normal camera with natural objects as a subject. The spoke pattern on the right-hand side of the image is brought into focus. In FIG. 18, no quality deterioration due to electrical noise can be visually confirmed, but objects in front of the focus (tips of colored pencils) and objects behind the focus (a poster of "HITACHI") are blurred.

Figure 19:
FIG. 19 is a diagram showing an example of an image acquired by WFC with the use of the conventional phase plate.

FIG. 19 is a diagram showing an example of an image acquired by WFC with the use of the conventional phase plate 21. The objects (colored pencils) located in front in the image and the objects located behind (poster) therein are both brought into focus, and the focal depth expansion effect can be confirmed. However, quality deterioration due to electrical noise (the appearance of granular noise over the entire image) is obvious.

Figure 20:
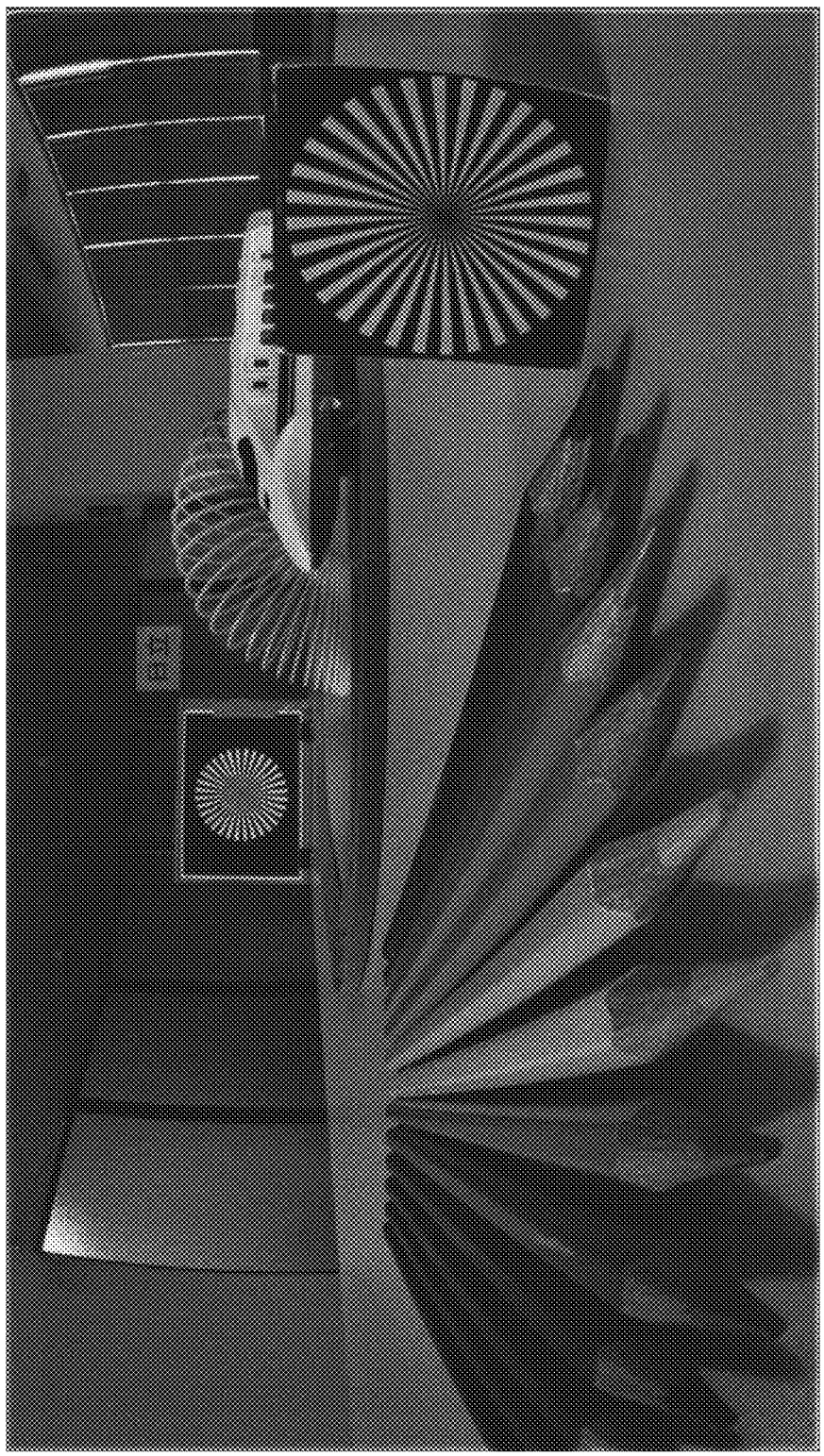
FIG. 20 is a diagram showing an example of an image acquired by WFC with the use of the phase plate according to the fifth embodiment.

FIG. 20 is a diagram showing an example of an image acquired by WFC with the use of the phase plate 29 according to the fifth embodiment. The focal depth expansion effect can be confirmed as in the case of using the conventional phase plate 21. In addition, although quality deterioration due to electrical noise can be visually confirmed, it is obvious that the quality deterioration is reduced as compared with the case of using the conventional phase plate 21.

FIGS. 21A to 21G are diagrams showing comparative examples of images of Gb pixels from among pixels for each color of R, Gr, Gb, and B of images acquired by a normal camera. FIG. 21A is an image of only the Gb pixels extracted from among the pixels for each color of R, Gr, Gb, and B of the acquired image. The subject 1 for this experiment is a uniform gray-scale cardboard, which appears as an image in the image of FIG. 21A.

The range of 192 vertical×192 horizontal pixels, shown as a square frame in FIG. 21A, was extracted from the image acquired for each system, and luminance histograms were created. FIG. 21B shows an enlargement of the 192×192 Gb pixels of the image acquired by the normal camera, and FIG. 21C shows the luminance histogram thereof. In the histogram of FIG. 21C, the standard deviation σ (sigma) is 2.7. The standard deviation σ serves as an index of the magnitude of noise.

FIG. 21D shows an enlargement of the 192 vertical×192 horizontal Gb pixels of the image acquired by WFC with the use of the conventional phase plate 21, and FIG. 21E shows the luminance histogram thereof. In the histogram of FIG. 21E, the standard deviation σ is 38.0, and noise amplification is obvious as compared with the normal camera.

FIG. 21F shows an enlargement of the 192 vertical×192 horizontal Gb pixels of the image acquired by WFC with the use of the phase plate 29 according to the fifth embodiment, and FIG. 21G shows the luminance histogram thereof. In the histogram of FIG. 21G, the standard deviation σ is 20.1, and noise amplification is found as compared with the normal camera, but can be considered suppressed as compared with the case of using the conventional phase plate 21.

The foregoing provides the first to fifth embodiments according to the present invention. The constituent optical components and imaging systems according to the first to fifth embodiments make it possible to suppress electrical noise amplification in WFC.

It is to be noted that the present invention described above is not to be considered limited to the examples mentioned above, but considered to encompass various modification examples. For example, the embodiments mentioned above have been described in detail for clearly explaining the present invention, but are not necessarily to be considered limited to the inclusion of all of the configurations described.

In addition, it is possible to replace a part of a configuration according to an embodiment with a configuration according to another embodiment. In addition, it is also possible to add a configuration according to an embodiment to a configuration according to another embodiment. In addition, it is possible to add/remove/substitute another configuration to/from/for a part of the configuration according to each embodiment. In addition, the respective configurations, functions, processing units, processing means, etc. mentioned above may be partially or entirely achieved with hardware, for example, by designing with integrated circuits.

In addition, the respective configurations, functions, etc. mentioned above may be partially achieved with software in a way that a processor interprets and executes programs for achieving the respective functions. Information such as programs, tables, and files for achieving the respective functions can be stored on recording devices such as memories, hard disks, SSD (Solid State Drive), or recording media such as IC cards, SD cards, and DVDs, and for the execution, read out on a RAM (Random Access Memory) or the like, and executed by a CPU (Central Processing Unit) or the like.

In addition, the control lines and information lines are shown which are considered required for the sake of explanation, but all of the control lines and information lines required for a product are not always shown. In fact, it is conceivable that almost all of the configurations are interconnected.

In addition, the respective configurations, functions, processing units, etc. mentioned above may be partially or entirely achieved with a distribution system, for example, by execution in another device and integrated processing through a network.

In addition, the technical elements according to the embodiments may be applied by itself, or adapted to be applied in multiple separated parts, such as a program part and a hardware part.

The present invention has been described above mainly with reference to the embodiments.

What is claimed is:

1. An optical component comprising:
multiple annular zones each configured to provide a predetermined phase to a light flux passing through an optical system,
wherein each of the annular zones has a curved peak, a protruding cross-sectional shape that defines an outer circumferential end, and at a bottom end of the cross-sectional shape, a standing wall having a straight surface,
wherein each of the annular zones has a first surface extending between an inner edge of the annular zone and a peak of the cross-sectional shape and a second surface extending between the peak of the cross-sectional shape and an outer edge of the annular zone,
for each of the annular zones, the first surface is substantially equal in area to the second surface, and
in a cross section in a radial direction of the optical component, for each annular zone, a tangent at the outer circumferential end of the annular zone is substantially equal in inclination to a tangent at the inner edge of the annular zone.

2. The optical component according to claim 1, wherein adjacent ones of the multiple annular zones are connected to each other.

3. The optical component according to claim 1, wherein the inclination at the inner circumferential end of any of the annular zones is larger than the inclination at the inner circumferential end of any other annular zone located closer to the inner circumference than the annular zone.

4. The optical component according to claim 1, wherein the innermost annular zone among the multiple annular zones is an annular zone configured not to add the phase.

5. An imaging optical system comprising the optical component according to claim 1.

6. An imaging system comprising an image processing unit configured to apply predetermined signal processing to image information acquired in the imaging optical system according to claim 5.

* * * * *